3,326,773
METHOD FOR PRODUCING L-GLUTAMIC ACID FROM FURAN COMPOUNDS
Atsushi Kakinuma Nishinomiya, and Saburo Yamatodani, Minoo, Japan, assignors to Takeda Chemical Industries, Ltd., Osaka, Japan
No Drawing. Filed Jan. 4, 1965, Ser. No. 423,367
Claims priority, application Japan, Mar. 30, 1964, 39/17,519
23 Claims. (Cl. 195—30)

This invention relates to a method for producing L-glutamic acid and, more particularly, to a method for producing L-glutamic acid which comprises reacting an enzyme system produced by microorganisms of the genus Pseudomonas or the genus Bacillus with furan compound and nitrogen source.

Certain microorganisms have been found to utilize furan compounds such as 2-furaldehyde, 2-furoic acid, etc. which have never been used in the fermentation art as a sole or the main carbon source. Moreover, culturing of the said microorganisms has been found to accumulate, in the culture broth, an enzyme system capable of producing L-glutamic acid from furan compound and nitrogen source. It has also been found that such enzyme system is adaptable to the production of L-glutamic acid on an industrial scale. Further, it has been found that the said microorganisms belong to the genus Pseudomonas or the genus Bacillus and that among the furan compounds, those represented by the formula

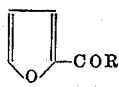

wherein R is H or OH, are most preferable. (Hereinafter furan compounds having the general formula

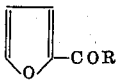

wherein R is H or OH, are collectively referred to as furan compound.)

One object of this invention is to provide a method for producing L-glutamic acid by the action of an enzyme system produced by microorganisms which utilize furan compound. Another object of this invention is to provide a method for efficiently producing L-glutamic acid on an industrial scale. These objects are realized by reacting an enzyme system produced by microorganisms of the genus Pseudomonas or the genus Bacillus with furan compound and nitrogen source.

In the method of this invention, microorganisms of the genus Pseudomonas or the genus Bacillus, which utilize furan compound as the only or the main carbon source and accumulate an enzyme system capable of producing L-glutamic acid from furan compound and nitrogen source, are employed. Among the said microorganisms, Pseudomonas No. 5863, (ATCC No. 15779), Pseudomonas No. 3742 (ATCC No. 15780), Bacillus No. 4700 or Bacillus megaterium 169 (ATCC No. 15781) are especially preferably employed for the production of L-glutamic acid, each of said microorganisms having been isolated directly from a natural source, i.e. soil, sewage, etc..

The strains No. 5863, No. 3742 and No. 4700 have the following microbiological characteristics, respectively:

Strain No. 5863.—Small rods, no endospores, motile with polar flagella, Gram negative, milk turns alkaline, nitrates reduced to nitrites and gas formed, gelatin not liquefied, acid from glucose.

Strain No. 3742.—Small rods, no endospores, motile with polar flagella, Gram negative, fluorescent chromogenesis, milk turns alkaline, nitrates reduced to nitrites, gelatin not liquefied, acid from glucose.

Strain No. 4700.—Large rods, sporulated, motile with peritrichous flagella, Gram positive, milk turns alkaline, litmus reduced, nitrates reduced to nitrites, gelatin not liquefied, acid from glucose.

Collating the above mentioned properties with the description in "Bergey's Manual of Determinative Bacteriology" 7th edition, it has been found that the strains Nos. 5863 and 3742 belong to the genus Pseudomonas and strain No. 4700 to the genus Bacillus, though there are no species already established with which these three microorganisms are to be classified.

Besides those above mentioned, the strains which belong to various species of the genus Pseudomonas or the genus Bacillus and which utilize furan compound as the only or the main carbon source are also available in the method of this invention. These strains are, for example, those of *Pseudomonas coronafaciens* (Elliott) Stevens, *Pseudomonas marginalis* (Brown) Stevens, *Pseudomonas striafaciens* (Elliott) Starr et Burkholder, *Pseudomonas polycolor* Clara, *Pseudomonas chlororaphis* (Guignard et Sauvageau) Bergey et al., *Pseudomonas iodinum* (Davis) Tobie, *Bacillus subtilis* (Ehrenberg), Cohn, *Bacillus cereus* Frankland et Frankland and *Bacillus circulans* Jordan emend. Ford.

The method of this invention comprises reacting an enzyme system produced by a microorganism of the genus Pseudomonas or the genus Bacillus with furan compound and nitrogen source.

The method of this invention is effected by either (1) incubating a microorganism of the genus Pseudomonas or of the genus Bacillus in a culture medium containing furan compound, as the only or main carbon source, and nitrogen source, or (2) reacting the culture broth, or its processed matter, of a microorganism of the genus Pseudomonas or Bacillus with furan compound and nitrogen source.

In case (1) above, it is further preferable for the culture medium to contain inorganic substances, trace elements, and other growth promoting factors such as potassium salt, magnesium salt, calcium salt, phosphate, sulfate, etc. Various carbon sources other than furan compound, e.g. glucose, fructose, lactose, maltose, sucrose, dextrin, starch, blackstrap molasses, etc. may be added to the culture medium, if desired. Nitrogen source may be any of those which serves as amino group donor and as nutrient for the growth of microorganisms. For example, there may be employed ammonium salt, aqueous ammonia, nitrate, urea, etc. In most cases, the addition of such materials as yeast extract, meat extract, peptone, cornsteep liquor, vitamins, etc. is advantageous, because the addition of such materials increases the utilization of furan compound by the microorganisms and a higher yield of L-glutamic acid can be obtained.

From the view-point of industrial production, the use of liquid medium is preferable and the incubation is carried out either stationarily or by the submerged method with aeration and/or agitation.

The optimum concentration of furan compound is between about 1 and 2% (weight).

The pH of the culture medium, the incubation temperature and other conditions to be controlled are variable with the physiological properties of the microorganisms employed, the composition of the culture medium, etc. and they should be adjusted so that maximum amount of L-glutamic acid is produced. Generally, the pH of the culture medium is adjusted within the range of 6.0–9.5 throughout the incubation period by the addition of alkaline substance, e.g. sodium hydroxide, potassium hydroxide, aqueous ammonia, etc. or acidic substance, e.g. hydrochloric acid, sulfuric acid, phosphoric acid, acetic acid, etc., and the incubation temperature is in most cases from 24–35° C.

Under the above-mentioned culture conditions, L-glutamic acid is produced in the culture medium with the lapse of time. Other amino acids than L-glutamic acid are hardly produced.

Incubation is continued until the maximum amount of L-glutamic acid accumulates in the culture medium. Period required for the maximum accumulation of L-glutamic acid changes with various factors such as composition of the culture medium, conditions of incubation, aeration and/or agitation, etc. In general, L-glutamic acid in the culture medium reaches the maximum in 2 to 5 days.

When the method of this invention is effected by (2) reacting culture broth, or its processed matter, of microorganisms belonging to the genus Bacillus or Pseudomonas with furan compound and nitrogen source, the process is sufficiently carried out by contacting the culture broth or its processed matter with a solution containing furan compound and nitrogen source. In practice, it may be carried out by adding furan compound and nitrogen source to the culture broth or its processed matter, or by adding cells of the microorganisms belonging to the genus Pseudomonas or the genus Bacillus to a solution containing furan compound and nitrogen source, etc.

In the procedure (2), furan compound is preferably employed at a relatively high concentration which stops the growth of microorganisms, i.e. at a relatively high concentration which is not applicable in the means (1). Generally it is preferable to employ furan compound in 2–4% (by weight) concentration. At more than 4% concentration, almost all the microorganisms are inhibited in their growth. For the purpose of obtaining a high yield of L-glutamic acid, antibiotic may further be added to the reaction mixture, so that the growth of any microorganism which consumes once-produced L-glutamic acid is completely stopped.

The nitrogen source is any compound which serves as an amino group donor for L-glutamic acid. For example, inorganic nitrogen compounds such as aqueous ammonia, ammonium salt, nitrate, etc. and organic nitrogen compound such as urea, aspartic acid, etc. are effectively employed. In general, the employment of aqueous ammonia or ammonium salts, etc. is preferable from the view-point of cost. Further, a reaction promoting agent such as yeast extract, etc. may be employed if desired.

The reaction is preferably carried out at about 25–45° C. and at pH 6–9 under aerobic or submerged conditions. Period required for the reaction varies with concentration of substrate, the amount of enzyme system capable of producing L-glutamic acid from furan compound and nitrogen source, reaction temperature, etc. In general, 2 to 3 days are sufficient for the completion of the reaction.

The culture broth employed in the method of this invention is prepared by incubating a microorganism of the genus Pseudomonas or the genus Bacillus in a solid or liquid culture medium containing assimilable carbon source, digestible nitrogen source, and preferably, inorganic substances, trace elements and other growth promoting factors, e.g. calcium salt, magnesium salt, potassium salt, phosphate, sulfate, vitamins, etc. As the assimilable carbon source, there may, for example, be used starch, dextrin, sucrose, lactose, maltose, glucose, blackstrap molasses, glycerol, etc. and as the nitrogen source, inorganic or organic nitrogen compounds such as ammonium salt, nitrate, cornsteep liquor, peptone, meat extract, soybean cake, yeast extract, yeast, urea, etc. Generally, an addition of such compound as yeast extract, meat extract, peptone, cornsteep liquor, vitamins, etc, is especially preferable, in view of the strong action thereof to promote growth of microorganisms. Further, the culture medium preferably contains a small amount of furan compound, generally up to about 0.2% (weight), which serves to produce stronger enzyme activity in the culture fluid. Furan compound may be added either at the time the culture medium is prepared or directly into the culture medium where microorganisms are growing. The incubation conditions should be adjusted so that an enzyme system capable of most effectively producing L-glutamic acid from furan compound and nitrogen source is produced. Generally, the initial reaction of the culture medium and the incubation temperature is preferably about neutral and at about 20–45° C., respectively. Period required for an incubation varies with the incubation conditions. Generally, the incubation is continued for about 12 to 48 hours.

Under the above-mentioned incubation conditions, culture broth containing an enzyme system capable of producing L-glutamic acid from furan compound and nitrogen source is produced.

As the processed matter of the culture broth employed in the method of this invention, there may, for example, be cells obtained from the culture broth of micro-organisms of the genus Pseudomonas or the genus Bacillus by filtration or centrifugation, etc., cell free extract, purified enzyme system, etc.

In the method of this invention, it is preferable to employ furan compound in a relatively high concentration from the view-point of the yield of L-glutamic acid. Therefore, the procedure (2) may be more preferable in most cases than (1) for the preparation of L-glutamic acid on an industrial scale.

The recovery of L-glutamic acid is carried out by means of per se generally-known means for the separation of L-glutamic acid from culture broth. L-glutamic acid is accumulated in the liquid portion, i.e. in the culture fluid when the method of this invention is carried out by the procedure (1), and in the reaction mixture by the alternative (2). For example, the recovery of L-glutamic acid is carried out by concentrating the liquid portion under reduced pressure, followed by adjusting pH to the isoelectric point of L-glutamic acid and leaving the resultant solution standing to precipitate L-glutamic acid. Ion-exchange resin or other adsorbent may also be used for the purpose of recovering L-glutamic acid.

The following examples are illustrative only and are not meant to limit the scope of this invention. Throughout the specification, the abbreviations "ml.," "l.," "mM.," "M.," "mg." and "g." mean respectively "milliliter(s)," "liter(s)," "millimol(s)," "mol(s)," "milligram(s)," and "gram(s)," and percent is weight percent unless otherwise described.

Example 1

Pseudomonas No. 5863 (ATCC No. 15779) incubated for 2 days on an agar slant (pH 7.2) comprising 0.2% of 2-furoic acid, 0.1% of ammonium chloride, 0.1% of dipotassium hydrogenphosphate, and 0.01% of magnesium sulfate, is inoculated in 50 parts by volume of bouillon medium (pH 7.2) in a receptacle of 200 parts by volume capacity, and subjected to aerobic incubation on a rotary shaker at 28° C. After 8 hours incubation, 1 part by volume of 10% solution of 2-furoic acid adjusted previously to pH 7.5 with sodium hydroxide is added aseptically and the incubation is continued for further 10 hours. Then, an aqueous solution of 2.1 parts by weight of 2-furoic acid, the pH of the solution being adjusted to 7.6 with aqueous ammonia, is added to the culture and the incubation is further continued with shaking. After 50 hours, 1.1 parts by weight of L-glutamic acid are produced. Consumed amount of 2-furoic acid is 1.4 parts by weight. The yield of L-glutamic acid is 76 percent relative to 2-furoic acid consumed.

Example 2

Pseudomonas No. 5863 (ATCC No. 15779) is incubated for 18 hours in the same way as in Example 1. To the resultant culture broth are added ammonium 2-furoate and chloramphenicol to make the respective final concentrations 2% in terms of 2-furoic acid and $10^{-3}$ M. Forty-eight-hour incubation with shaking produces 13.2 mg./ml. of L-glutamic acid. The consumed amount of 2-furoic acid is 19.1 mg./ml. The yield of L-glutamic acid is 69.1 percent relative to 2-furoic acid consumed.

*Example 3*

A reaction mixture (pH 7.5) containing wet cells (3.5 mg./ml. as dry matter) collected by centrifugation from the culture broth in Example 2 and washed with distilled water three times, 100 mM. of sodium-2-furoate and 200 mM. of ammonium chloride is shaken at 37° C. for 10 hours to produce 45 mM. of L-glutamic acid. Consumed amount of 2-furoic acid is 78.8 mM. The molar yield of L-glutamic acid is 56.8 percent relative to the consumed 2-furoic acid.

*Example 4*

Pseudomonas No. 3742 (ATCC No. 15780) incubated for 3 days on an agar slant (pH 7.2) comprising 0.2% of 2-furaldehyde, 0.1% of ammonium chloride, 0.1% of dipotassium hydrogenphosphate and 0.01% of magnesium sulfate, is inoculated in 50 parts by volume of bouillon medium (pH 7.2) in a 200 parts by volume capacity receptacle, and subjected to aerobic incubation on a rotary shaker at 28° C. After 6 hours, 0.1 part by volume of 2-furaldehyde is added to the inoculated medium and the incubation is continued for further 12 hours. Then the cells are collected by centrifugation and washed 3 times with distilled water. Thus obtained wet cells are mixed with 2-furaldehyde and ammonium chloride, the final concentration of the components in the reaction mixture being 0.4 mg. (as dry matter)/ml. 25 mM., 50 mM., respectively. This mixture is shaken at 37° C. for 6 hours to produce 1.4 mM. of L-glutamic acid.

*Example 5*

150 parts by volume of an aqueous solution containing 1% of 2-furoic acid, 0.4% of urea, 0.1% of dipotassium hydrogenphosphate and 0.01% of magnesium sulfate (7 hydrate) is poured into receptacles of 500 parts by volume capacity, followed by adjusting the pH to 6.5 with sodium hydroxide. After sterilization, the pH of the solution increases to 8.2.

Pseudomonas No. 5863 (ATCC No. 15779) previously incubated in a bouillon agar medium containing 0.2% of 2-furoic acid at 28° C. for 2 days, is inoculated in the said culture medium and incubated at 28° C. for 70 hours under shaking. Consumed amount of 2-furoic acid in the medium is 7.6 mg./ml., and the accumulated amount of L-glutamic acid is 2.0 mg./ml.

About 4200 parts by volume of the culture filtrate thus obtained is concentrated under reduced pressure, followed by acidification to pH 3.2. The resultant solution is cooled for 24 hours to precipitate 6.1 parts by weight of crude crystals of L-glutamic acid.

*Example 6*

Bacillus megaterium 169 (ATCC No. 15781) is inoculated in the same way as in Example 5 on a medium comprising 2% of 2-furoic acid, 0.4% of urea, 0.1% of dipotassium hydrogenphosphate, 0.01% of magnesium sulfate (7 hydrate) and 0.1% of yeast extract, and then incubated for 72 hours. Accumulated amount of L-glutamic acid is 0.8 mg./ml., and consumed amount of 2-furoic acid is 5.2 mg./ml.

*Example 7*

Incubation is carried out in the same way as in Example 5 except for the addition of 0.1% of yeast extract to the culture medium. Accumulated amount of L-glutamic acid is 2.2 mg./ml. and consumed amount of 2-furoic acid is 9.2 mg./ml.

Microorganisms employed in these examples have been deposited in American Type Culture Collection (ATCC), Rockville, Maryland, U.S.A.; bearing the respective accession numbers abbreviated as "ATCC No. 15779, ATCC No. 15780, and ATCC No. 15781."

Although the examples are limited to the preferred strains, the invention is not so limited since other strains of the aforesaid genera can also be employed. These strains are exemplified by *Pseudomonas coronafaciens* (Elliott) Stevens No. 5, *Pseudomonas marginalis* (Brown) Stevens No. 175, *Pseudomonas striafaciens* (Elliott) Starr et Burkholder No. 4, *Pseudomonas polycolor* Clara No. 170, *Pseudomonas chlororaphis* (Guignard et Sauvageau) Bergey et al. No. 159, *Pseudomonas iodinum* (Davis) Tobie No. 44, *Bacillus subtilis* (Ehrenberg) Cohn No. 94, *Bacillus cereus* Frankland et Frankland No. 139 and *Bacillus circulans* Jordan emend. Ford. No. 132, etc.

Having thus disclosed the invention, what is claimed is:

1. A method for producing L-glutamic acid, which comprises reacting an enzyme system produced by a microorganism of the Pseudomonas genus which utilizes furan compound as carbon source, with furan compound and nitrogen source.

2. A method for producing L-glutamic acid, which comprises reacting an enzyme system produced by a microorganism of the Bacillus genus which utilizes furan compound as carbon source, with furan compound and nitrogen source.

3. A method for producing L-glutamic acid, which comprises reacting an enzyme system produced by a microorganism of the Pseudomonas genus which utilizes furan compound as carbon source, with furan compound and nitrogen source, and then recovering thus accumulated L-glutamic acid.

4. A method for producing L-glutamic acid, which comprises reacting an enzyme system produced by a microorganism of the Bacillus genus which utilizes furan compound as carbon source, with furan compound and nitrogen source, and then recovering thus accumulated L-glutamic acid.

5. The method claimed in claim 3, wherein the reaction is carried out by incubating the microorganism in a culture medium containing furan compound and nitrogen source at a temperature between 24 and 35° C. and at pH between 6.0 and 9.5.

6. The method claimed in claim 4, wherein the reaction is carried out by incubating the microorganism in a culture medium containing furan compound and nitrogen source at a temperature between 24 and 35° C. and at pH between 6.0 and 9.5.

7. The method claimed in claim 3, wherein the reaction is carried out by reacting culture broth of the microorganism, containing said enzyme system, with furan compound and nitrogen source at a temperature between 20 and 45° C. and at pH between 6.0 and 9.0.

8. The method claimed in claim 4, wherein the reaction is carried out by reacting culture broth of the microorganism, containing said enzyme system, with furan compound and nitrogen source at a temperature between 20 and 45° C. and at pH between 6.0 and 9.0.

9. The method claimed in claim 3, wherein the reaction is carried out by reacting cells from the culture broth of the microorganism, said cells containing said enzyme system, with furan compound and nitrogen source at a temperature between 20 and 45° C. and at pH between 6.0 and 9.0.

10. The method claimed in claim 4, wherein the reaction is carried out by reacting cells from the culture broth of the microorganism, said cells containing said enzyme system, with furan compound and nitrogen source at a temperature between 20 and 45° C. and at pH between 6.0 and 9.0.

11. The method claimed in claim 3, wherein the microorganism is Pseudomonas No. 5863 (ATCC No. 15779).

12. The method claimed in claim 3, wherein the microorganism is Pseudomonas No. 3742 (ATCC No. 15780).

13. The method claimed in claim 4, wherein the microorganism is *Bacillus Megaterium* No. 169 (ATCC No. 15781).

14. The method claimed in claim 3, wherein furan compound is 2-furoic acid.

15. The method claimed in claim 4, wherein furan compound is 2-furoic acid.

16. The method claimed in claim 3, wherein furan compound is 2-furaldehyde.

17. The method claimed in claim 4, wherein furan compound is 2-furaldehyde.

18. The method claimed in claim 5, wherein the concentration of furan compound is about between 1 and 2%.

19. The method claimed in claim 6, wherein the concentration of furan compound is about between 1 and 2%.

20. The method claimed in claim 7, wherein the concentration of furan compound is about between 2 and 4%.

21. The method claimed in claim 8, wherein the concentration of furan compound is about between 2 and 4%.

22. The method claimed in claim 9, wherein the concentration of furan compound is about between 2 and 4%.

23. The method claimed in claim 10, wherein the concentration of furan compound is about between 2 and 4%.

No references cited.

A. LOUIS MONACELL, *Primary Examiner.*

L. M. SHAPIRO, *Assistant Examiner.*